Feb. 16, 1971 H. B. GARDNER ET AL 3,564,418

SINGLE CHANNEL DISPLAY OF SERIAL DATA

Filed Oct. 21, 1968 2 Sheets-Sheet 1

INVENTORS
HUGH B. GARDNER
ALICK H. FRANK

BY [signature]

ATTORNEY

INVENTORS
HUGH B. GARDNER
ALICK H. FRANK

BY

ATTORNEY 3,564,418

SINGLE CHANNEL DISPLAY OF SERIAL DATA

Hugh B. Gardner, Oxon Hill, Md., and Alick H. Frank, Springfield, Va., assignors to the United States of America as represented by the Secretary of the Navy Filed Oct. 21, 1968, Ser. No. 769,349
Int. Cl. H04b *1/00*
U.S. Cl. 325—320 5 Claims

ABSTRACT OF THE DISCLOSURE

A system for displaying six phase varying frequencies appearing in sequence on a single channel as phase variations of a single frequency on one channel. This is accomplished by filtering each phase varying frequency onto a separate line. An isolation network to prevent ringing of parallel adjacent filters is provided. The separated inputs are mixed to produce a single frequency whose phase varies as the original input. The phase of the single frequency thus generated is compared to a local reference.

STATEMENT OF GOVERNMENT INTEREST

Figure 1A:
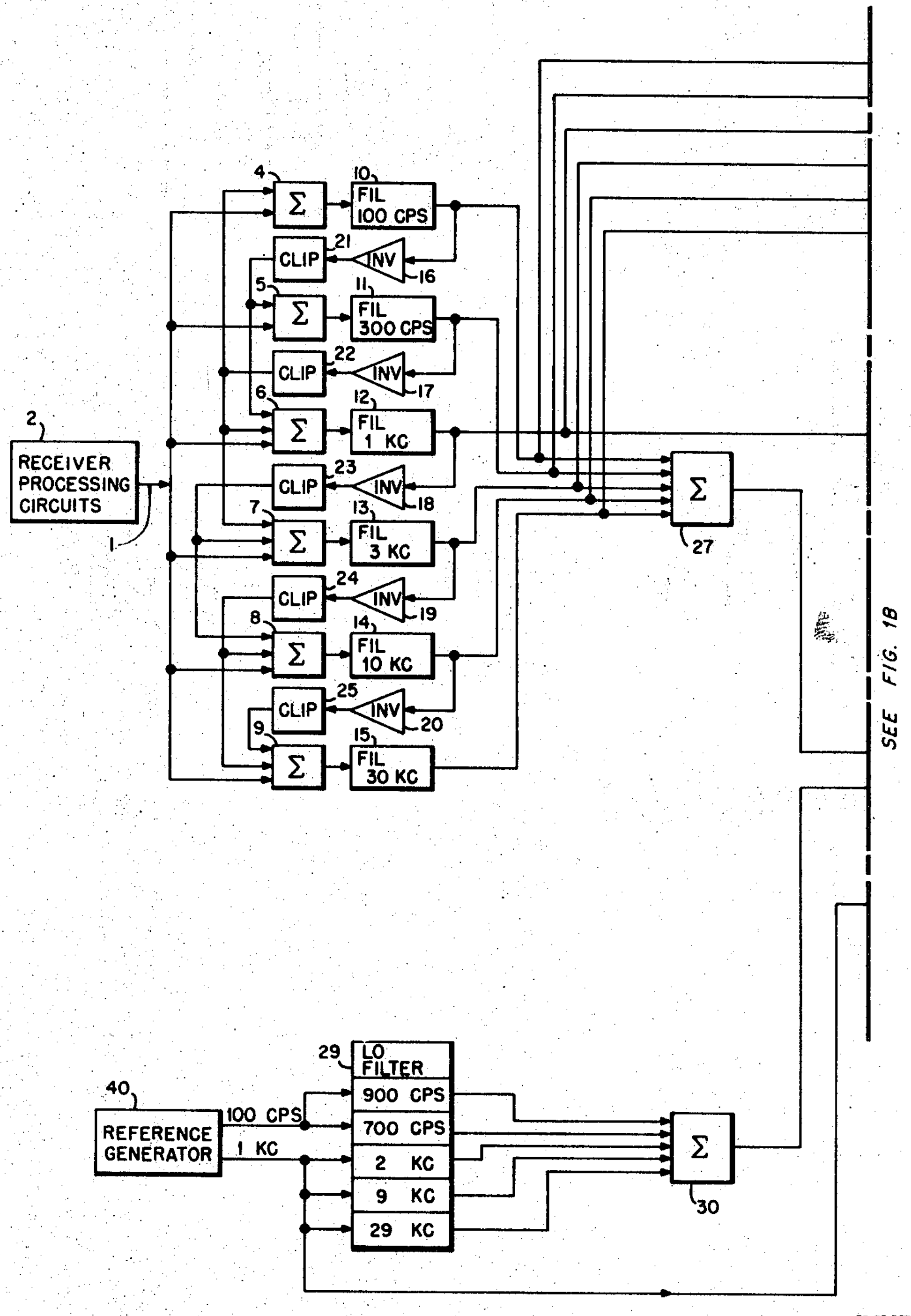
Figure 1B:
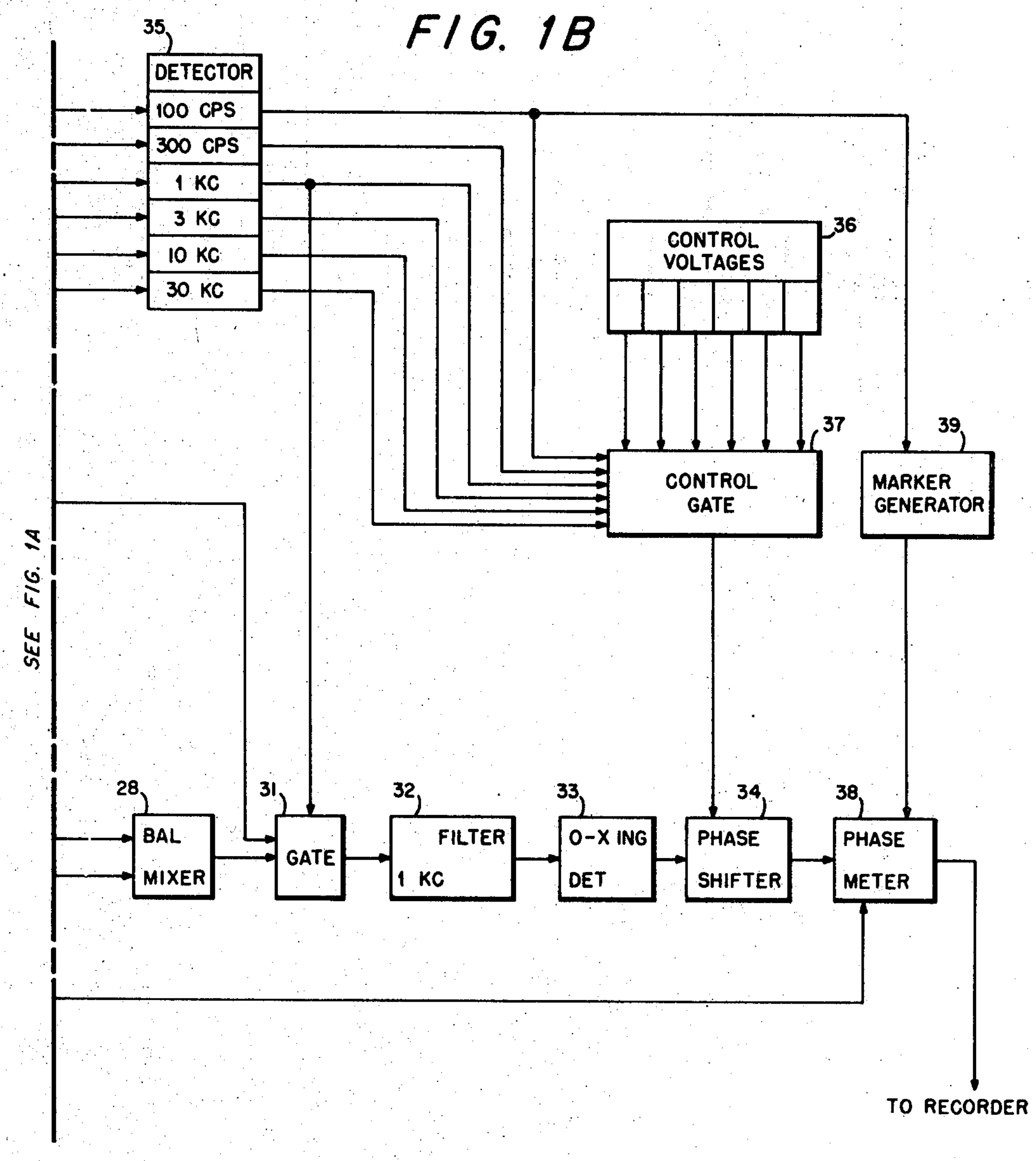

The invention described herein may be manufactured and used by or for the Government of the United States of America for governmental purposes without the payment of any royalties thereon or therefor.

BACKGROUND OF THE INVENTION

The invention relates generally to a system in which information is received in the form of phase variations in each of a plurality of frequencies sequentially present at an input. More specifically the system converts phase variations at six different frequencies into phase variations of a single frequency on a single channel.

In some systems, for example in a system wherein space surveillance antennas are linked to computer centers by commercial telephone lines, information from a distance is often transmitted in the form of phase variations of several frequencies which are transmitted on single channel in time sequence. A receiver capable of processing such information must be able to sense variations in phase accurately. Prior systems have used filtering means to separate each of the frequencies into a separate channel. Then each frequency is compared to a local standard to determine phase variations. These phase variations were then recorded on lines, equal in number to the number of frequencies monitored. This method involved the use of a plurality of local oscillators and required that the output be recorded on a plurality of lines. A strip chart recorder consisting of a plurality of channels was needed to record the phase information. Such a system, in that it provided phase information on several frequencies, was not compatible with a single tone telemetry system.

It is an object of the invention therefore to provide a single channel output for a system of the type in which phase information is present on a plurality of frequencies.

A further object is to provide a system in which the output phase information is present on one frequency and is therefore compatible with a single frequency tone telemetry system.

Another object is to reduce the complexity of the prior art systems.

These and other objects are achieved in the system of the invention by separating each phase varying input frequency onto a separate line, mixing this input with another which has a frequency chosen such that all input frequencies are converted to one selected frequency and comparing the phase variations of said one frequency with a local reference.

Other and further features, objects, and advantages will be more readily perceived from the following more detailed description of a specific embodiment of the invention and as well from the appended claims and the drawing acompanying this application.

The drawing is a block diagram of the invention.

DESCRIPTION OF THE PREFERRED EMBODIMENT

In the drawing, the input from the receiver processing system 2 is present in the form of six phase varying frequencies ranging from 100 c.p.s. to 30 kc.p.s. Each frequency appears in sequence on a single input channel 1. The input is fed to six parallel adding circuits 4–9. Connected to each adder are filters 10–15 tuned to one of the frequencies of the input signal. The input on line 1 is a sequence of clipped waveforms high in harmonic content. It is possible therefore for one input frequency to ring the two adjacent higher frequency filters 11 and 12. Thus the 100 c.p.s. signal is capable of ringing the 300 c.p.s. and 1 kc. filter. This is true also of the other frequencies. To provide the necessary degree of isolation between the filters, the invention provides a cancellation system consisting of inverters 16–20, clippers 21–25 and adders 4–9. The isolation feature will be explained in reference to filters 10–12. For proper operation of the isolation network the filters 10–15 are adjusted so that the output from the filters is in phase with their input, i.e., a zero phase shift through the filters. The output of filter 10 is routed into the inverter 16 and clipper 21. The 100 c.p.s. output from clipper 21 will be identical to the input 100 c.p.s. signal present on the input line but will have a negative amplitude. Thus where the input to filter 10 had a 100 c.p.s. signal with a positive amplitude, the output from the clipper 21 will contain a negative amplitude. The output from cliper 21 is connected to the adder input preceding the 300 c.p.s. and 1 kc. filter. In this fashion, the 100 c.p.s. signal is nulled in adders 5 and 6 before it has a chance to ring the filters 11 and 12. In a similar fashion the output from each of the other filters is inverted, clipped, and fed into their adjacent adders. The above scheme gives a degree of isolation not possible with filters alone. Since the 30 kc. filter is the highest in the system no isolation network is connected to filter 15.

The outputs from all filters except the 1 kc. filter are fed into a linear adder 27 where they are summed and amplified. The output from adder 27 is supplied as one input to balanced mixer 28. The other input to the mixer 28 comes from a tone generator consisting of a reference generator 40 and a series of filters 29. The reference generator output consists of pulses at 100 c.p.s. and 1 kc. on separate lines and of a short enough time duration so as to ring the filters 29. The output from adder 30 consists of the sum of five tones selected such that the balanced mixer 28 will produce a 1 kc. signal for each occurrence of the different input frequencies. The output from the 1 kc. filter 12 bypasses the mixer 28 since it is already at the desired frequency. Since only one data carrying frequency is present at the input to mixer 28 at a time, only one of the sum and difference frequencies will fall within the narrow band of a 1 kc. filter. It can be seen that as each different input frequency becomes present at the input of the system, it is processed through mixer 28 as a 1 kc. signal. The gate 31 functions to gate through the 1 kc. output from filter 12 and at the same time block the output from mixer 28. Filter 32 allows only 1 kc. components of the balance mixer output to pass. The zero-crossing detector 33 operates in a conventional manner by squaring the 1 kc. waveform. Phase shifter 34 compensates for any phase shifts in the input signal caused by circuit components. Since the phase shifts will vary according to the frequency of the signal being processed, the phase shifter is made variable in response to control voltages. The outputs from the filters 10–15 are fed to detectors 35. Each of the detectors provides a D.C. voltage on a separate line in response to a particular frequency. Thus a D.C. control voltage will be present on only one of the lines out of detector 35 at any time. Control voltage generator 36 provides a series of voltages each corresponding to an individual frequency. Each voltage provides for a particular amount of phase shift when applied to the phase shifter 34. Each of the control voltages is gated into phase shifter 34 by control gate 37. Thus the control voltage corresponding to a 100 c.p.s. frequency is gated into the phase shifter 34 upon the occurrence of a D.C. voltage on the 100 c.p.s. output line from detector 35. The output from phase shifter 34 at any one frequency is in phase with the input to the system at that frequency. Phase meter 38 provides an output which is a function of the phase difference between a 1 kc. signal produced by a reference generator and the output of phase shifter 34. The output from the phase meter can be made to drive a strip chart recorder or may be sent to a remote location via a tone telemetry system. A marker generator 39 functions to interrupt the output of the phase meter so as to identify a particular frequency. In the specific embodiment it is used to mark the occurrence of a 100 c.p.s. signal and for this reason is connected to the 100 c.p.s. output line from detector 35.

The control voltages 36 for each of the different frequency components needed to accomplish phase shifting could conveniently be supplied by a bleeder network. Detector circuits 35 used to supply the gating signal upon the occurrence of each of the separate input frequencies can be constructed of ordinary rectifier and filter networks and the control gate 37 can be composed of conventional AND gate logic circuits. The invention has been described using clipping means in the filter isolation network, however, these are only necessary if the input from the receiver processing circuits is clipped. In addition the zero-crossing detector can be dispensed with and a sine wave reference used for comparison in the phase meter. The phase shifting function can be performed by a variable delaying circuitry with the amount of delay proportional to control voltage received through gating means 37.

Numerous and varied arrangements embodying the principles of the invention of which the above described embodiment is illustrative will readily occur to those skilled in the art. No attempt to exhaustively illustrate all possible such arrangements has been made.

What is claimed and desired to be secured by Letters Patent of the United States is:

1. In a system for receiving an input signal in the form of phase variations of a plurality of time sequenced frequencies, a post detection processing system comprising:

means for separating each of said plurality of input frequencies onto an individual channel, a mixer, means for applying said separated frequencies to one input of said mixer, a tone generator coupled to another input of said mixer for generating a mixing signal with a plurality of frequency components selected such that each of said input frequencies when mixed with said mixing signal will produce a distinct preselected frequency component in the output of said mixer, a filter coupled to said mixer means for passing only said preselected frequency component, a reference generator for producing a signal at said preselected frequency, and phase measuring means coupled to said filter and said reference generator for producing a signal proportional to the phase difference between said preselected frequency component and said reference generator signal.

2. The system recited in claim 1 wherein said means for separating each of said input frequencies onto an individual channel comprises:

a plurality of filter means for separating each of said input frequencies onto an individual channel, at least one inverter circuit means coupled to the output of a first of said filter means, at least one adder circuit means with an input side coupled to said input signal and coupled to the output of one of said inverter circuit means, the output from said adder means coupled to a second of said filter means, whereby an output at a particular frequency from one of said filtering means is inverted and added to the input signal at the same frequency to produce a null at the output of said adder circuit.

3. The system as recited in claim 1 further including:

phase control means coupled to said filter for displacing the phase of said preselected frequency signal by different amounts corresponding to each of said input frequencies.

4. The system as recited in claim 3 wherein said phase control means comprises:

a source of a plurality of control voltages, one for each of said input frequencies, a plurality of detector means coupled to said filter means for providing a signal indicating the presence of each of said input frequencies, gating means coupled to said source and said detectors for passing one of said control voltages upon the occurrence of a signal from one of said detectors corresponding to a particular input frequency, and a phase shifter coupled to said gating means for displacing said preselected frequency signal by different amounts proportional to the voltage received from said gating means.

5. The system as recited in claim 4 further including:

means coupled to one of said detector means and said phase measuring means for varying the output of said phase measuring means upon the occurrence of a signal from said detector whereby it is possible to distinguish the presence of said signal, and recording means for displaying the output of said phase measuring means.

No references cited.

ROBERT L. GRIFFIN, Primary Examiner

A. J. MAYER, Assistant Examiner

U.S. Cl. X.R.

325—363